(12) United States Patent
Huang et al.

(10) Patent No.: US 6,905,076 B2
(45) Date of Patent: Jun. 14, 2005

(54) HIGH TEMPERATURE INCUBATION SYSTEM AND METHOD FOR SMALL VOLUMES

(75) Inventors: Yunping Huang, Urbana, IL (US); Yehia S. Mechref, Bloomington, IN (US); Milos V. Novotny, Bloomington, IN (US)

(73) Assignee: Advanced Research and Technology Institute, Inc., Indianapolis, IN (US)

( * ) Notice: Subject to any disclaimer, the term of this patent is extended or adjusted under 35 U.S.C. 154(b) by 0 days.

(21) Appl. No.: 10/643,501

(22) Filed: Aug. 19, 2003

(65) Prior Publication Data

US 2004/0096961 A1 May 20, 2004

Related U.S. Application Data

(60) Provisional application No. 60/426,958, filed on Nov. 15, 2002.

(51) Int. Cl.[7] .............................................. A01K 31/20
(52) U.S. Cl. ........................................... 237/14; 236/2
(58) Field of Search ......................... 237/3, 14; 236/2, 236/3

(56) References Cited

U.S. PATENT DOCUMENTS

| | | | |
|---|---|---|---|
| 3,553,426 A | | 1/1971 | Fink |
| 3,616,264 A | | 10/1971 | Ray et al. |
| 4,679,615 A | | 7/1987 | Livne |
| 5,192,910 A | * | 3/1993 | Hepp et al. ................. 324/315 |
| 5,635,397 A | * | 6/1997 | Futschik et al. .......... 435/286.1 |
| 5,795,547 A | * | 8/1998 | Moser et al. ................ 422/104 |
| 5,856,082 A | | 1/1999 | Aebersold et al. |
| 5,942,432 A | | 8/1999 | Smith et al. |
| 6,015,534 A | * | 1/2000 | Atwood ....................... 422/102 |
| 6,036,920 A | * | 3/2000 | Pantoliano et al. ............ 422/67 |
| 6,180,779 B1 | | 1/2001 | Parekh et al. |
| 6,482,615 B2 | | 11/2002 | Tal et al. |
| 6,562,298 B1 | * | 5/2003 | Arnquist et al. ............... 422/63 |
| 6,617,557 B1 | * | 9/2003 | Ryan et al. .................. 219/634 |

OTHER PUBLICATIONS

Electron Microscopy Sciences, "Centrifuges and Accessories" webpages, available at www.aname.es/microscopia/ems/equipment/centrifuge.html, printed on Nov. 13, 2002, 6 pgs.

EXCEL Scientific, Inc., "Clear–View Screw–Cap Microtubes" webpages, available at www.excelscientific.com/screwcap.html, printed on Nov. 13, 2002, 7 pgs.

National Scientific Supply Company, "BioStar Tube Racks" webpages, available at www.nat-sci.com/Products/BioTech/Racks/racks.html, printed on Nov. 13, 2002, 2 pgs.

DiaMed Lab Supplies Inc., Quicklist 2000 Catalogue p. 77, "Grant Value Baths", available at www.diamedlab.com/Page0077.htm, printed on Nov. 13, 2002, 4 pgs.

DiaMed Lab Supplies, Inc., Quicklist 2000 Catalogue p. 22, "Floating Racks", available at www.diamedlab.com/Page0022.htm, printed on Nov. 13, 2002, 3 pgs.

DiaMed Lab Supplies, Inc., Quicklist 2000 Catalogue p. 13, "Microtubes", available at www.diamedlab.com/Page0013.htm, printed on Nov. 13, 2002, 3 pgs.

* cited by examiner

Primary Examiner—Derek S. Boles
(74) Attorney, Agent, or Firm—Barnes & Thornburg LLP

(57) ABSTRACT

A system and method of incubating a liquid is provided. The system is well-suited for incubating small volumes of liquid at high temperatures. The liquid may be a reaction mixture comprising a glycoprotein. During the incubation process, oligosaccharides may be removed from the glycoprotein.

27 Claims, 4 Drawing Sheets

HIGH TEMPERATURE INCUBATION SYSTEM AND METHOD FOR SMALL VOLUMES

This application claims priority under 35 U.S.C. §119(e) to U.S. Provisional Application Ser. No. 60/426,958, filed on Nov. 15, 2002, the disclosure of which is hereby incorporated by reference herein.

UNITED STATES GOVERNMENT GRANT

The United States Government has rights in this invention by virtue of National Institutes of Health Grant No. GM24349 from the National Institute of General Medical Science, Department of Health and Human Services.

BACKGROUND OF THE INVENTION

The present disclosure relates to an incubation system and method, and particularly, to a system and method for incubating small volumes at high temperature. More particularly, the present disclosure relates to an incubation system and method that permits chemical reactions in small volumes without substantial loss of reagents due to evaporation.

It is sometimes desirable to incubate liquid samples to promote a chemical reaction in the liquid. Incubation of some liquids can occur at room temperature, but more typically, incubation of liquids occurs at elevated temperatures. Some liquids to be incubated, such as glycoproteins, are available only in small amounts. Glycoproteins are sometimes incubated, for example, to remove oligosaccharides for subsequent analysis. The smaller the volume of a liquid that is incubated, the more that evaporation of the liquid is a concern because, once the reactants dry, the desired reaction usually stops. For example, a 0.5 microliter ($\mu l$) aliquot placed in a vial may evaporate to dryness in less than five minutes, leaving a dried un-reacted powder at the bottom of the vial.

Past attempts to prevent evaporation of small liquid samples in incubators include maintaining a high humidity near the incubator to retard evaporation and replenishing evaporated water from an aqueous reaction as it progresses. A high humidity can be uncomfortable for workers and ineffective in slowing evaporation. Replenishing evaporated water can be labor intensive and prone to error caused by overly diluting the reaction mixture. Thus, there is a need for an improved system and method of incubating small volumes of liquid.

SUMMARY OF THE INVENTION

According to the present invention a system and method for incubating a liquid is provided. The volume of liquid to be incubated may be small, such as about 0.5 microliters ($\mu l$) to about 100 ($\mu l$). The liquid to be incubated may be a reaction mixture comprising glycoprotein. The incubation may take place at elevated temperatures. The liquid to be incubated may be deposited on a sample-receiving region of an inner surface of a vessel. The vessel may comprise a vial and a closure member, such as a lid. The sample-receiving region may be at one end of the vial and the closure member may couple to an opposite end of the vial. During incubation, the vial may be inverted such that the sample-receiving region is above the closure member. At least some of the liquid may adhere to the sample-receiving region during incubation. During incubation, liquid vapor may be extant in the vessel below the liquid adhered to the sample-receiving region. The gas may condense back into the liquid adhered to the sample-receiving region. During incubation, some or all of the vessel may be heated, such as by being placed in contact with water in a heated water bath. The sample-receiving region may be the coolest portion of the inner surface of the vessel during incubation. A holder to which the vessel couples may be provided. The holder may be made of a material that floats, such as a sponge material or Styrofoam material. The sample-receiving region may be a portion of a concave surface of the vessel. The concave surface may be substantially conical. The sample-receiving region may include an apex of the concave surface.

In an illustrative embodiment, a vial or microtube has a body with an open, first end and a closed, second end. A liquid to be incubated is deposited on a sample-receiving region of an inner surface of the second end and then the first end is closed with a closure member, such as a lid. When the vial is upright having the first end above the second end, the sample-receiving region is the bottom portion of the inner surface of the vial. After the liquid to be incubated is deposited on the sample-receiving region, the vial is inverted such that the sample-receiving region is above the closure member. At least a substantial portion of the liquid adheres to the sample-receiving region after the vial is inverted. In the illustrative embodiment, the inverted vial is positioned so that a first portion of the vial, including the first end and closure member, is submerged in a bath of heated water and so that a second portion of the vial, including the second end, the sample-receiving region, and the liquid adhered to the sample-receiving region is situated above an upper surface of the water. During incubation, a temperature gradient exists along the inner surface of the vial with the sample-receiving region of the inner surface being at a lower temperature than substantially all other regions of the inner surface.

Additional features of the invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures, in which.

DETAILED DESCRIPTION OF THE DRAWINGS

Figures 1, 2:
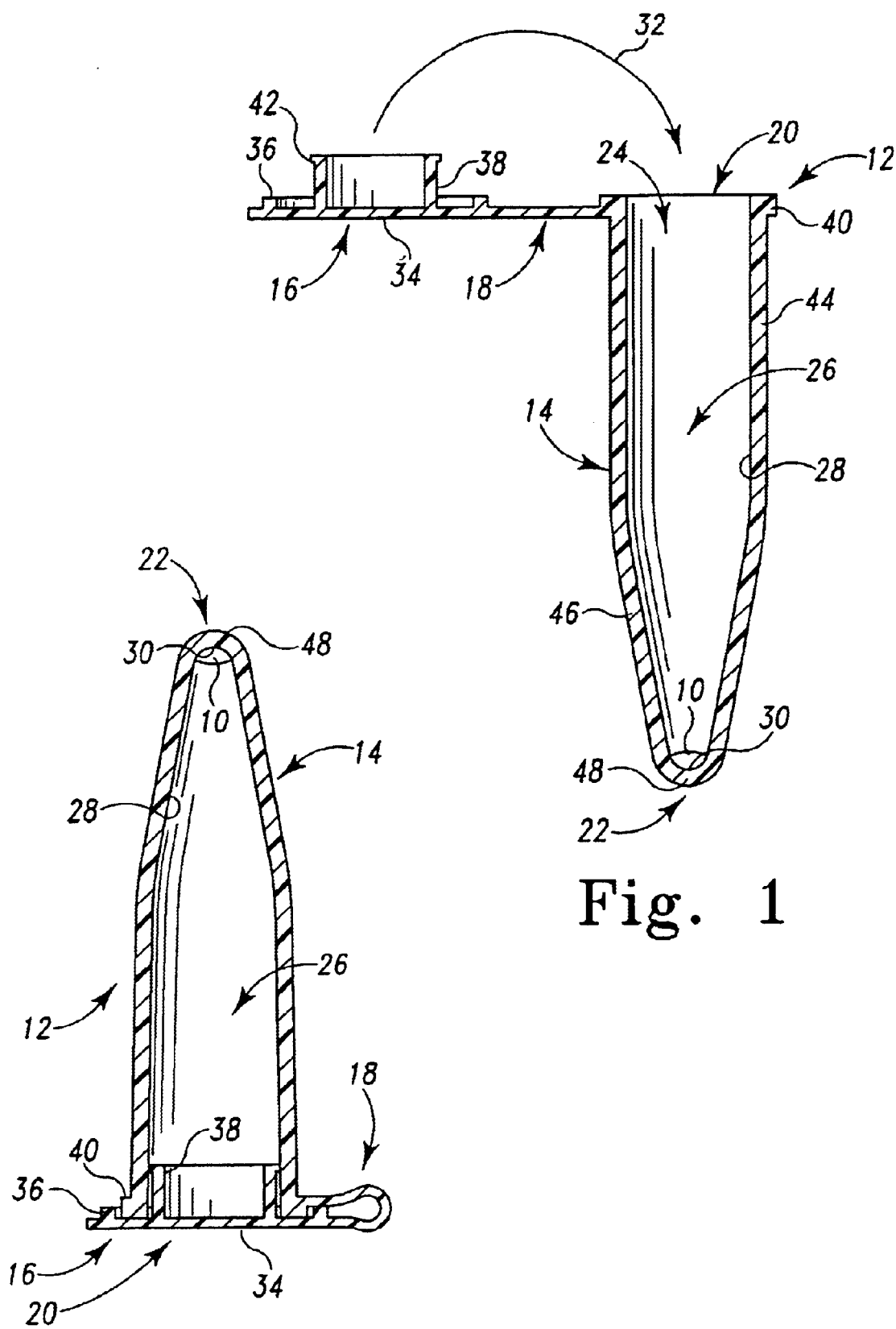
FIG. 1 is a cross sectional view of a vial showing a small volume of a liquid deposited on a sample-receiving region of an inner surface of a body of the vial, the sample-receiving region being the lowermost portion of the inner surface, and showing a closure member tethered to the body and movable in the direction of the arrow to close an opening in an upper end of the body.
FIG. 2 is a cross sectional view, similar to FIG. 1, showing the vial in an inverted position having the sample-receiving region above the closure member and showing the small volume of liquid adhering to the sample-receiving region.

In accordance with this disclosure, a small volume of liquid 10 is incubated in a vessel 12, such as a vial or microtube of the type shown in FIG. 1. In some embodiments, vessel 12 is made from a plastics material, such as polypropylene, that is substantially transparent. Illustrative vessel 12 has a body 14 and a closure member, such as a cap or a lid 16, that is coupled to body 14 by a tether 18. Body 14 of vessel 12 has a first end 20 and an opposite, second end 22. First end 20 has an opening 24 through which an interior region 26 of vessel 12 is accessed. Interior region 26 is bounded by an inner surface 28 of vessel 12. Liquid 10 is deposited on a sample-receiving portion or region 30 of surface 28. A pipette (not shown) or other suitable liquid-depositing device may be inserted through opening 24 to deposit liquid 10 on region 30.

After liquid 10 is deposited on region 30 of vessel 12, cap 16 is moved in the direction of arrow 32 to close opening 24. Illustrative cap 16 has a cover 34, an annular rim 36 extending from cover 34, and a cylindrical wall 38 that extends from cover 34. Cap 16 snaps onto body 14 such that rim 36 surrounds an annular flange 40 at first end 20 of body 14. When cap 16 closes opening 24, wall 38 extends from cover 34 into interior region 26 and an annular sealing ring 42 appended to wall 38 engages inner surface 28 to seal interior region 26 from the ambient surroundings. In alternative vessel embodiments, the opening of a vessel body may be closed and/or sealed by a cap that threads onto the vessel body or by a resilient plug that is wedged into the opening of the vessel body. Thus, all methods of closing and/or sealing an opening in a vessel body are contemplated as being within the scope of this disclosure.

It is known that small volumes of liquid, such as about 0.5 $\mu$l to about 100 $\mu$l, have a tendency to evaporate rather quickly. When liquids are heated, the rate of evaporation increases. Thus, when incubating small volumes of liquid by heating, evaporation of the liquid is of concern. Heated gases, such as those evaporating from a liquid during incubation, have a tendency to rise. In addition, a heated gas has a tendency to condense on surfaces that are cooler than the gas. It is also known that capillary attraction exists between the molecules of liquids and the molecules of solid containers in which liquids are contained. In some embodiments, vessel 12 is heated in such a manner that sample-receiving region 30 is the portion of surface 28 that is at the lowest temperature, thereby promoting condensation of the gas which evaporates from liquid 10 on surface 28 closely adjacent the liquid 10 or back into liquid 10 itself. Thus, when vessel 12 is heated during incubation in such embodiments, a temperature gradient along inner surface 28 is created with sample-receiving portion 30 of inner surface 28 of vessel 12 being at a lower temperature than substantially all other portions of inner surface 28 of vessel 12. In other embodiments, the vessel is inverted so that the liquid to be incubated is at the top portion of the inner surface of the vessel and the entire vessel 12 is heated, such as by complete submersion in a heated water bath.

Due to the small volume of liquid 10 in vessel 12, when vessel 12 is turned upside down, as shown in FIG. 2, liquid 10 adheres to region 30 as a result of capillary attraction between liquid 10 and vessel 12, even though region 30 is above liquid 10. Thus, forces imparted on the small volume of liquid 10 to adhere liquid 10 to region 30 are larger than forces imparted on the small volume of liquid 10 by gravity.

It will be appreciated that a number of factors contribute to the capillary attraction forces between liquid 10 and vessel 12 and such factors may include, for example, the viscosity of liquid 10, the volume of liquid 10, the geometry of region 30, the type of material from which vessel 12 is made, and the temperature of liquid 10 and/or vessel 12.

Polypropylene microcentrifuge tubes of 0.7 milliliters (ml) and 1.7 ml have been found to have suitable geometry and surface characteristics to permit small liquid volumes of up to about 100 $\mu$l to adhere to the concave surfaces at the tips thereof at room temperature. Such microcentrifuge tubes are available from a number of suppliers, such as DialMed Lab Supplies, Inc., Millipore Corporation, National Scientific Supply Company, Electron Microscopy Sciences, and Excel Scientific, Inc. Vessel 12 is illustrative of the shape of these types of microcentrifuge tubes. However, vessels of all shapes and sizes are considered to be within the scope of this disclosure, so long as the liquid to be incubated in such vessels is able to adhere to a region of an inner surface thereof in a desired manner.

Illustrative vessel 12 has a cylindrical portion 44 and a substantially conical portion 46 appended to the cylindrical portion 44 as shown best in FIGS. 1 and 2. The tip or apex 48 of conical portion 46 is rounded and provides the bottom portion of vessel 12 when vessel is oriented as shown in FIG. 1 with first end 20 vertically above second end 22. Portion 46 is still considered to be substantially conical in accordance with this disclosure, even though apex 48 is rounded rather than forming a sharp point. However, vessels with conical portions having sharp points or terminating at flat surfaces are within the scope of this disclosure. The concave portion of inner surface 28 associated with apex 48 provides some or all of sample-receiving region 30. Of course, if the volume of liquid 10 deposited in vessel 12 is large enough, then a portion of inner surface 28 associated with the tapered wall of portion 46 that extends away from apex 48 also provides a portion of sample-receiving region 30. In the illustrative embodiment of vessel 12, the wall thickness of portions 44, 46 is substantially uniform.

While this disclosure is intended to cover all types of liquids to be incubated, liquid 10 is typically a reaction mixture comprising reagents that are mixed together to promote a desired chemical reaction. In some embodiments, liquid 10 may be incubated at room temperature, but more typically, liquid 10 is incubated at an elevated temperature. In most instances, chemical reactions of reagents in liquids proceed at higher rates with increasing temperature. In some embodiments in which incubation is to proceed at room temperature, vessel 12 is oriented so that second end 22 is vertically above first end 20 as shown in FIG. 2. Any gas that evaporates from liquid 10 will have a tendency to collect just beneath and in close proximity to the liquid 10 adhered to region 30, thereby enhancing the probability that the gas will condense back into liquid 10.

Figure 3:
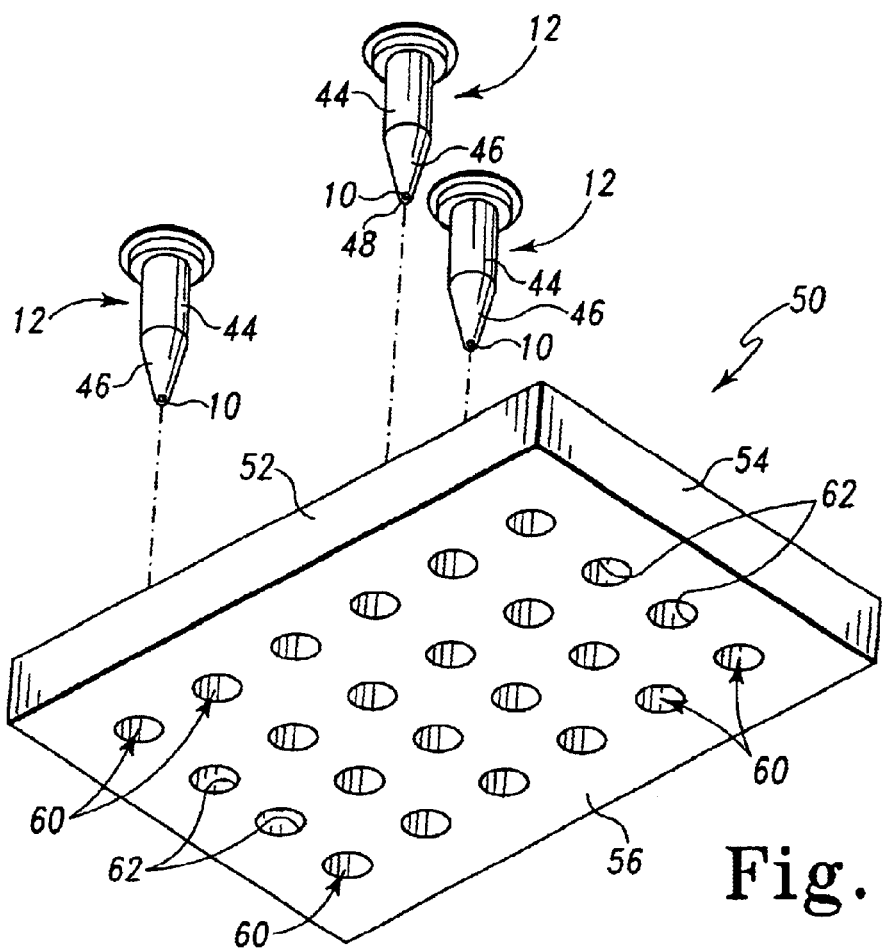
FIG. 3 is a perspective view showing a rectangular holder having an array of openings formed therethrough and showing three vials, each of which is substantially similar to the vial of FIGS. 1 and 2, each vial being arranged for insertion into a respective opening formed in the holder.
Figure 4:
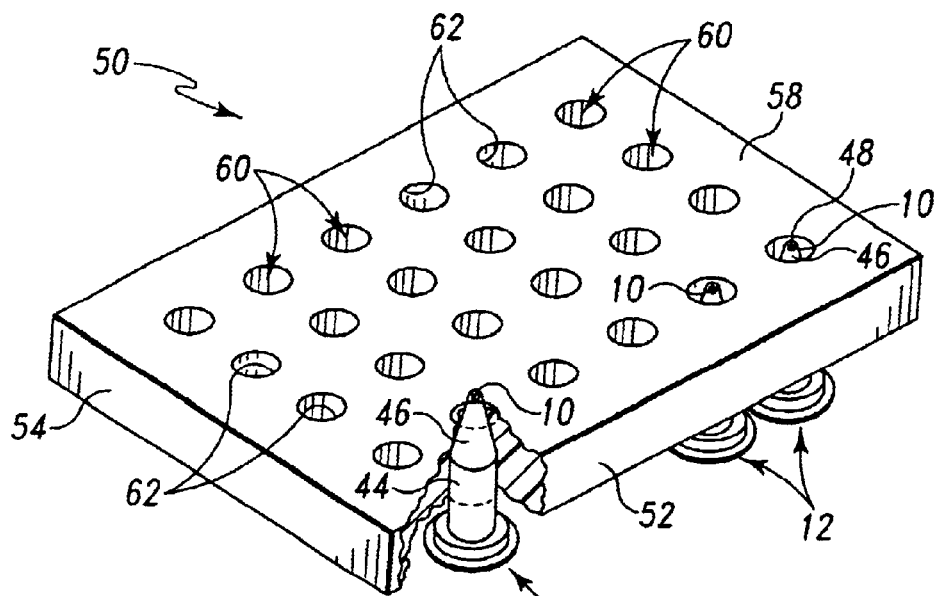
FIG. 4 is a perspective view, similar to FIG. 3, showing the three vials received in the respective openings of the holder, the holder flipped over so that each vial is in the inverted position, and a portion of the holder broken away for viewing one of the vials.

Referring now to FIGS. 3 and 4, a holder 50 may be used to hold one or more vessels, such as illustrative vessel 12, in a desired orientation. In some embodiments, holder 50 comprises a mass of material, such as Styrofoam material or sponge material. Illustrative holder 50 is shaped as a rectangular block and has a pair of side surfaces 52, a pair of end surface 54, a bottom surface 56, and a top surface 58. A plurality of openings or holes 60 are formed through holder 50 between surfaces 56, 58. Each hole 60 is bounded by a cylindrical surface 62 that is sized to receive cylindrical portions 44 of associated vessels 12 therein with a slight friction fit or press fit therebetween. Vessels 12 may be inserted downwardly into holes 60, as shown in FIG. 3, and then holder 50 may be flipped over to invert the vessels 12 coupled to holder 50. Alternatively, vessels 12 may first be inverted and then inserted upwardly into holes 60 as suggested in FIG. 4.

Figure 5:
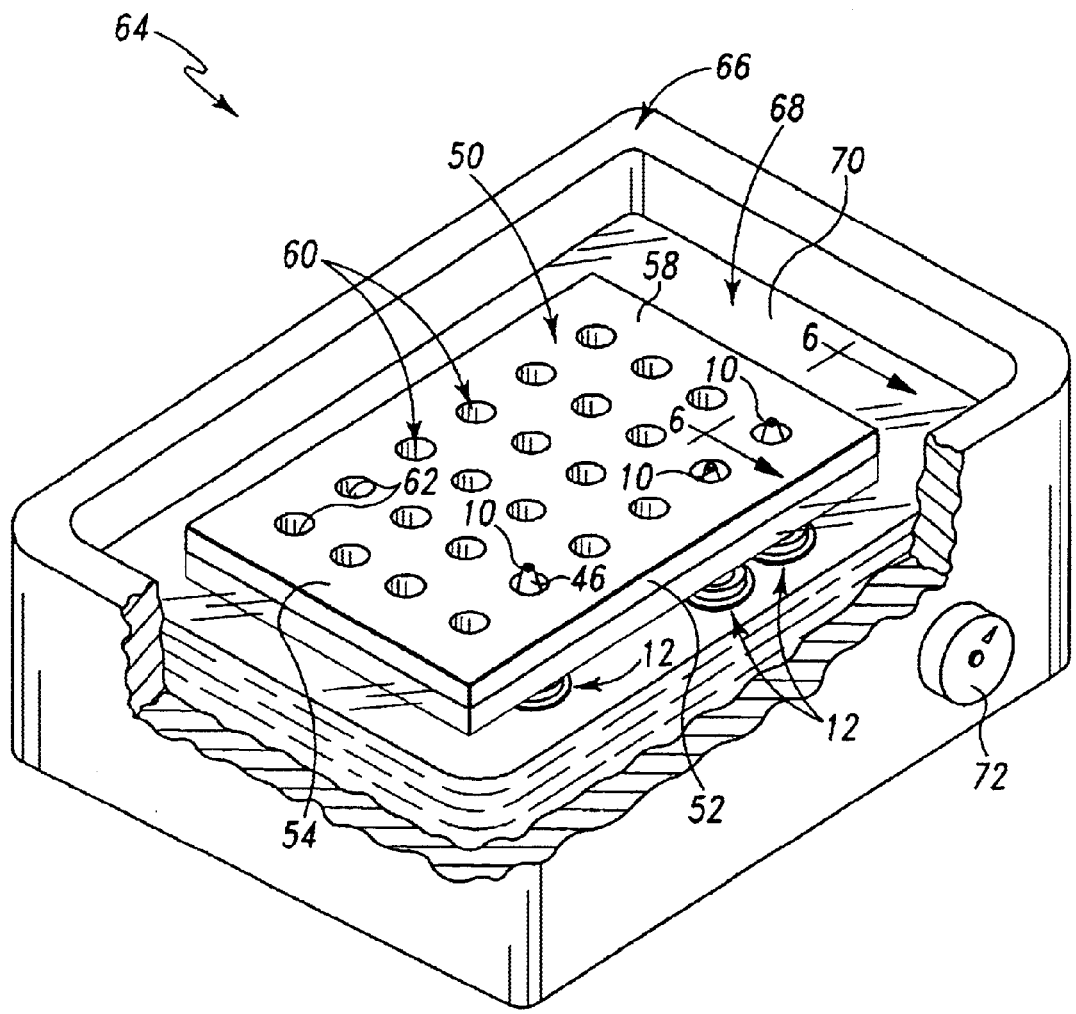
FIG. 5 is a perspective view of a container that contains heated water, with portions broken away, showing the holder and vials of FIG. 4 floating in the heated water to incubate the liquid adhering to the sample-receiving regions of the vials.
Figure 6:
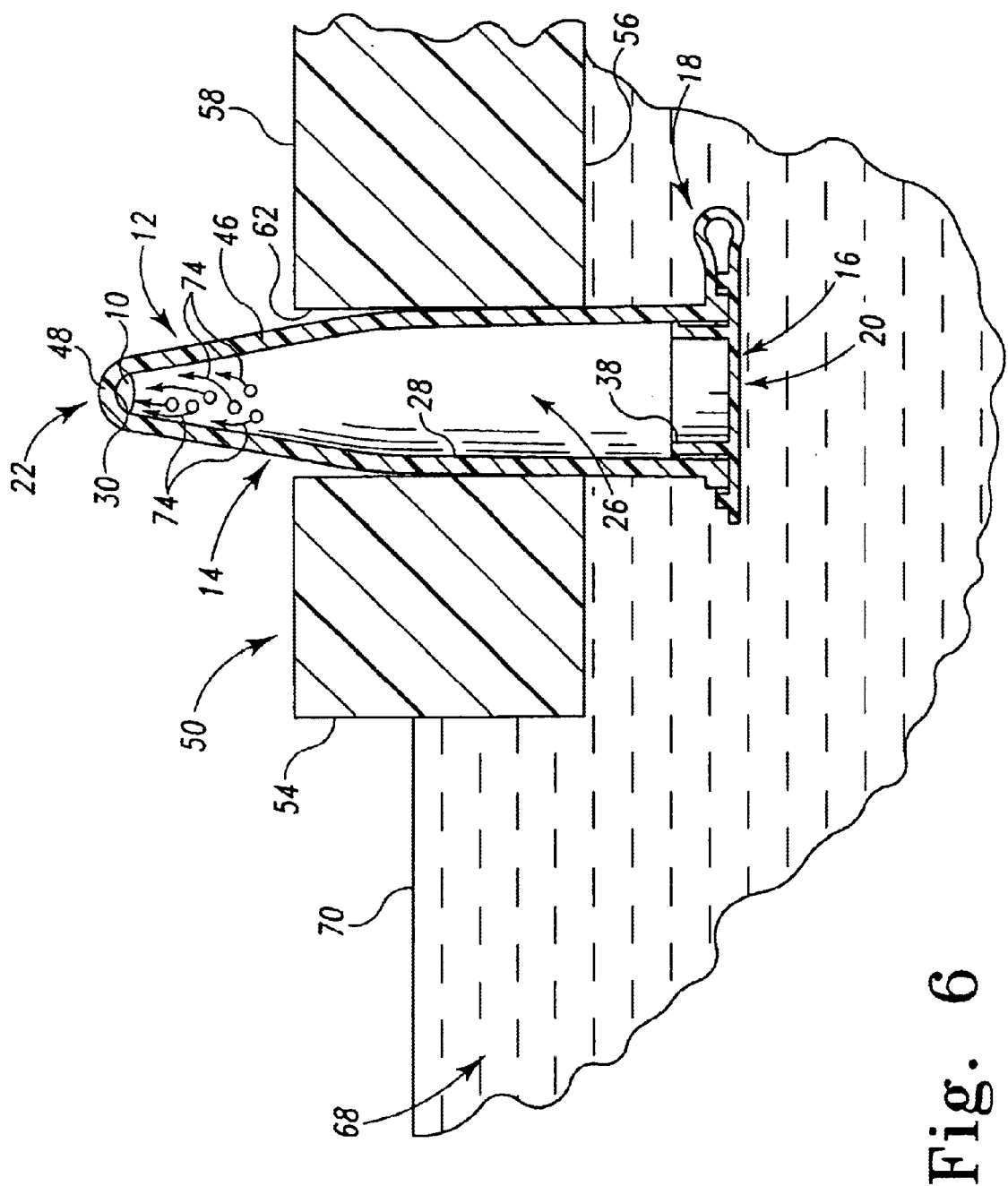
FIG. 6 is a fragmentary sectional view, taken along line 6—6 of FIG. 5, showing one end of the vial submerged in the heated water, a middle region of the vial received in the respective opening of the holder, the liquid being incubated situated above the upper surface of the heated water, and gas that has evaporated from the liquid sample having a tendency to move upwardly toward the liquid adhered to the sample-receiving region.

Holder 50 is sized such that the perpendicular distance between surface 56 and surface 58 is less than the distance between first end 20 and second end 22 of the vessels 12 to be coupled to holder 50. Thus, vessels 12 may be coupled to holder 50 so that a first portion of each vessel 12, such as part of the conical portion 46 of each vessel 12, extends beyond surface 58 (or, alternatively, surface 56) and so that a second portion of vessel 12, such as part of the cylindrical portion 44 of each vessel 12, extends beyond surface 56 (or, alternatively, surface 58) as shown in FIGS. 4–6. In the illustrative embodiment, each hole 60 is substantially the same size as each of the other holes, such that vessels 12 of the same size are coupleable to holder 50. In alternative embodiments, holes formed in holder 50 may have different sizes so that vessels 12 of varying sizes may be coupled to holder 50.

Referring now to FIG. 5, a heating apparatus 64 is provided for incubating the liquid 10 contained in vessels 12 that are coupled to holder 50. Illustrative heating apparatus 64 comprises a container or bath 66 of heated liquid 68. In some embodiments, the heated liquid 68 comprises water. Illustrative holder 50 floats in liquid 68 so that the portions of vessels 12 extending downwardly from holder 50 are submersed in liquid 68 and so that the portions of vessels 12 extending upwardly from holder 50 are above an upper surface 70 of liquid 68 as shown in FIGS. 5 and 6. Thus, in the illustrative embodiment, liquid 10 is situated above upper surface 70 of liquid 68. In alternative embodiments, other types of holders, such as arms, clamps, or plates that are coupled to container 66, are provided for holding vessels 12 so that part of vessels 12 are in contact with heated liquid 68 and so that part of vessels 12 are not in contact with liquid 68. In still other embodiments, one or more vessels 12 are inverted and completely submerged in heated liquid 68. In such embodiments, the holder does not float. Thus, unless specifically state otherwise, the term "holder" as used in this disclosure, including in the claims, is intended to mean all types of structures or devices that are capable of holding a vessel in a desired position.

Heating apparatus 64 has a heater (not shown) that produces heat to heat liquid 68 contained in container 66. The heater may comprise a heating element that generates heat in response to electric current flowing therethrough. Apparatus 64 has a controller (not shown) to control the temperature of liquid 64. A user input, such as illustrative knob 72, is provided for selecting the temperature of liquid 64. The controller of apparatus 64 may include a microprocessor, microcontroller, or other logic based circuit that receives feedback from a temperature sensor (not shown) to indicate the temperature of liquid 68 and that controls the application of current to the heating element to maintain liquid 68 within a tolerance range of the desired temperature.

When liquid 68 is at a particular elevated temperature, the portion of inner surface 28 associated with the portion of vessel 12 submerged in liquid 68 will also be substantially at the particular elevated temperature, assuming that vessel 12 has been partially submerged in liquid 68 for a suitable period of time. However, sample-receiving region 30, which is the portion of surface 28 that is spaced the farthest above surface 70 of liquid 68, will be at a temperature cooler than the temperature of liquid 68 and a temperature gradient will exist along surface 28 between region 30 and the portion of surface 28 that is beneath surface 70 of liquid 68. Any gas that evaporates from liquid 10 will have a tendency to remain in interior region 26 just beneath and in close proximity to the liquid 10 adhered to region 30 and will have a tendency to move upwardly, as indicated by arrows 74 in FIG. 6, so as to condense back into liquid 10 or onto the exposed portion of surface 28 that is at the lowest temperature, which should be the portion of surface 28 right next to liquid 10.

As mentioned above, one or more vessels may be inverted and then completely submerged in a heated liquid, such as a heated water bath. In such embodiments, vessel 12 and liquid 10 are heated to the same temperature as the heated liquid and therefore, no temperature gradient exists on surface 28 after vessel 12 and liquid 10 have been submerged in the heated liquid for a sufficient amount of time. However, losses due to evaporation are still minimized, or eliminated, because any gas phase of liquid 10 will rise in vessel 12 so as to be in close proximity to the liquid phase situated thereabove, thereby increasing the probability that the gas phase will condense back into liquid 10.

Although illustrative heating apparatus 64 comprises a bath of heated water, it is within the scope of this disclosure for heat to be applied to one or more vessels containing liquid 10 by other means, such as, for example, a radiant heater, heated gas, a convective heater, and a flame. In such embodiments, a sealed heating chamber beneath holder 50 may be used so that heat does not escape around the sides and ends of holder 50. In addition, although illustrative vessels 12 are oriented vertically having second end 22 and region 30 vertically above first end 20 during incubation, other orientations of vessel 12 are possible in accordance with this disclosure. So long as region 30 and liquid 10 have temperatures lower than substantially all other regions of vessel 12, it is believe that any gas phase extant in interior region 26 of vessel 12 will condense back into liquid 10 at, or very near, region 30.

Thus, the system and methods of incubation disclosed herein allows chemical reactions to take place in small volumes of liquid reaction mixtures at high temperatures (or, in some instances, at room temperature), while substantially reducing or altogether eliminating the loss of reagents to evaporation. In the illustrative embodiment, any gas phase that is formed beneath the liquid phase reaction mixture, which adheres to region 30 thereabove by capillary attraction, moves upwardly and back into the liquid phase. Using the systems and method disclosed herein, it has been found that a 0.5 $\mu$l reaction volume may be incubated at 37 degrees Celsius for twenty-four hours without significant evaporation. Several chemical reactions at volumes varying from 0.5 $\mu$l to 100 $\mu$l incubated between 37 degrees Celsius and 70 degrees Celsius for several hours have been successfully performed using the systems and methods disclosed herein. These reactions included enzymatic release of N-glycans from glycoproteins, enzymatic digestions of N-glycans, Tryptic digestion of proteins, chemical release of N- and O-glycans from glycoproteins. Furthermore, not only do the systems and methods disclosed herein allow for chemical reactions to be conducted at very small volumes, but also allow the chemical reactions to be accomplished in a shorter period of time than conventional incubation systems and methods, due to the fact that reducing the volume of the reaction mixture results in the presence of reactants in close proximity of each other leading to shorter reaction times.

Although the invention has been described in detail with reference to certain illustrative embodiments, variations and modifications exist with the scope and spirit of this disclosure as described and defined in the following claims.

What is claimed is:

1. A method of incubating a liquid, the method comprising
depositing the liquid on a sample-receiving portion of an inner surface of a vessel, and
applying heat to the vessel to create a temperature gradient along the inner surface of the vessel such that the sample-receiving portion of the inner surface of the vessel is at a lower temperature than substantially all other portions of the inner surface of the vessel.

2. The method of claim 1, wherein depositing the liquid comprises depositing about 0.5 microliters (µl) to about 100 (µl) of the liquid to be incubated.

3. The method of claim 1, wherein depositing the liquid comprises depositing a quantity of glycoprotein and a chemical reagent capable of reacting with said glycoprotein to cleave oligosaccharide moities.

4. The method of claim 1, wherein applying heat to the vessel comprises applying heat to a portion of the vessel that is remote from the sample-receiving portion.

5. The method of claim 1, further comprising coupling the vessel to a holder prior to applying heat.

6. The method of claim 5, wherein the holder comprises a mass of material with an opening therethrough and coupling the vessel to the holder comprises inserting the vessel into the opening so that a first portion of the vessel extends beyond a first side of the mass of material and so that a second portion of the vessel extends beyond a second side of the mass of material.

7. The method of claim 6, further comprising placing the mass of material in a bath of water so that the first portion of the vessel is in contact with the water and so that the sample-receiving portion with the liquid deposited thereon is not in contact with the water and applying heat to the vessel comprises heating the water.

8. The method of claim 1, wherein applying heat to the vessel comprises contacting a portion of the vessel with water in a heated water bath.

9. The method of claim 1, wherein the vessel comprises a sealable vial and the sample-receiving portion comprises a concave surface of the vial that is opposite an open end of the vial.

10. The method of claim 1, wherein the sample-receiving portion comprises a rounded apex of a substantially conical surface.

11. The method of claim 1, further comprising orienting the vessel such that the sample-receiving portion faces downwardly with the liquid adhering thereto.

12. The method of claim 11, wherein a gas is formed in a space in the vessel beneath the liquid as a result of heat being applied to a surface of the vessel below and remote from the sample-receiving portion.

13. A method of incubating a liquid, the method comprising depositing the liquid to be incubated in a vial having a body with an open first end and a closed second end, closing the open first end of the body with a closure member, inverting the vial so that the closed second end of the body is above the closure member and so that at least a substantial portion of the liquid adheres to an inner surface of the closed second end of the body, and heating at least a portion of the vial, including heating the first end of the body, so that a portion of the liquid in the vial forms a gas underneath the portion of liquid that adheres to the inner surface of the closed second end of the body.

14. The method of claim 13, wherein closing the open first end of the body with a closure member comprises attaching a friction-fitting lid to the first end of the body.

15. The method of claim 13, wherein depositing the liquid to be incubated comprises depositing about 0.5 microliters (µl) to about 100 (µl) of the liquid to be incubated.

16. The method of claim 13, wherein depositing the liquid to be incubated comprises depositing a quantity of glycoprotein and a chemical reagent capable of reacting with said glycoprotein to cleave oligosaccharide moities.

17. The method of claim 13, wherein heating at least a portion of the vial comprises applying heat to a lower portion of the vial that is remote from the sample-receiving portion.

18. The method of claim 13, further comprising coupling the vial to a holder prior to heating.

19. The method of claim 18, wherein the holder comprises a mass of material with an opening therethrough and coupling the vial to the holder comprises inserting the vial through the opening so that the first end of the vial is situated on one side of the mass of material and so that the second end of the vial is situated on an opposite side of the mass of material.

20. The method of claim 19, further comprising placing the mass of material in a bath of water so that the first end of the vial is in contact with the water and so that the liquid to be incubated is situated above the water and heating at least a portion of the vial comprises heating the water.

21. The method of claim 13, wherein heating at least a portion of the vial comprises contacting a portion of the vial with a heated water bath.

22. The method of claim 13, wherein depositing the liquid to be incubated comprises depositing the liquid to be incubated on a concave surface of the vial.

23. The method of claim 13, wherein depositing the liquid to be incubated comprises depositing the liquid to be incubated on a rounded apex of a substantially conical surface of the vial.

24. The method of claim 13, wherein heating at least a portion of the vial comprises heating the entire vial.

25. The method of claim 13, wherein heating at least a portion of the vial comprises submerging the entire vial in a heated water bath.

26. A method of incubating a liquid, the method comprising depositing the liquid on a sample-receiving portion of an inner surface in an interior region of a vessel, orienting the vessel so that the sample receiving-portion of the inner surface of the vessel is situated above the interior region of the vessel and has at least a substantial portion of the liquid adhered thereto, and heating at least a portion of the vessel to promote a chemical reaction in the liquid.

27. The method of claim 26, wherein heating at least a portion of the vessel comprises heating the entire vessel.

* * * * *